United States Patent [19]
Spinner et al.

[11] Patent Number: 5,771,174
[45] Date of Patent: Jun. 23, 1998

[54] DISTRIBUTED INTELLIGENCE ACTUATOR CONTROLLER WITH PEER-TO-PEER ACTUATOR COMMUNICATION

[75] Inventors: Robert E. Spinner, N. Vancouver; Ian C. Baron, Vancouver; Keith T. McCormick, Burnaby; J. Todd Sankey, Vancouver, all of Canada

[73] Assignee: Measurex Corporation, Cupertino, Calif.

[21] Appl. No.: 766,758

[22] Filed: Dec. 13, 1996

Related U.S. Application Data

[60] Provisional application No. 60/009,865 Dec. 21, 1995.
[51] Int. Cl.[6] .......................... G06F 19/00; G06G 7/64; G06G 7/66
[52] U.S. Cl. .............................. 364/471.03; 364/471.01; 364/471.02; 364/133; 364/135; 395/200.31
[58] Field of Search ...................... 364/471.03, 471.01, 364/471.02, 132, 133, 134, 135; 395/200.01, 200.02, 200.04, 200.08

[56] References Cited

U.S. PATENT DOCUMENTS

| | | | |
|---|---|---|---|
| 4,692,213 | 9/1987 | Dove | 162/259 |
| 4,833,941 | 5/1989 | Leppanen | 74/625 |
| 4,903,528 | 2/1990 | Balakrishnan et al. | 73/159 |
| 4,918,690 | 4/1990 | Makkula, Jr. et al. | 370/94 |
| 4,921,574 | 5/1990 | Hu | 162/198 |
| 4,947,684 | 8/1990 | Balakrishnan | 73/159 |
| 4,957,770 | 9/1990 | Howarth | 427/9 |
| 5,014,288 | 5/1991 | Chase et al. | 378/53 |
| 5,019,710 | 5/1991 | Wennerberg et al. | 250/341 |
| 5,022,966 | 6/1991 | Hu | 162/198 |
| 5,071,514 | 12/1991 | Francis | 162/259 |
| 5,096,542 | 3/1992 | Dove | 162/259 |
| 5,303,080 | 4/1994 | O'Brien et al. | 359/196 |
| 5,323,082 | 6/1994 | Wright | 310/328 |
| 5,381,341 | 1/1995 | Herrala et al. | 364/471 |
| 5,400,247 | 3/1995 | He | 364/148 |
| 5,400,258 | 3/1995 | He | 364/471 |
| 5,513,324 | 4/1996 | Dolin Jr. et al. | 395/200.18 |
| 5,539,634 | 7/1996 | He | 364/158 |
| 5,563,809 | 10/1996 | Williams et al. | 364/560 |

OTHER PUBLICATIONS

*Implementation of CD Control in DCS Environments*, Gary K. Burma, et al., Devron–Hercules Inc., N. Vancouver, B.C. Canada and Devron Incorporated, Wilmington, Delaware; Date Unknown.

*Primary Examiner*—Joseph Ruggiero
*Assistant Examiner*—Ramesh Patel
*Attorney, Agent, or Firm*—Loeb & Loeb LLP

[57] ABSTRACT

A distributed intelligence control system for controlling a cross direction profile characteristic of a traveling sheet, such as paper, during production, includes a scanner for measuring a property of the sheet at a plurality of cross direction locations and producing output signals indicative of the cross direction profile characteristic. A host controller system coupled to receive the output signals from the scanner produces signals representing desired profile information, based on the output signals from the scanner. The system further includes a plurality of actuators, each actuator being operatively associated with a corresponding intelligent actuator controller. A local area network provides a bidirectional communication link (1) between the host controller system and the intelligent actuator controllers and (2) between adjacent intelligent actuator controllers, the network transmitting to the intelligent actuator controllers the desired profile information from the host controller system and transmitting between adjacent intelligent actuator controllers actual actuator state information, the intelligent actuator controllers calculating target actuator positions based upon the transmitted information.

3 Claims, 8 Drawing Sheets

DISTRIBUTED INTELLIGENCE ACTUATOR CONTROLLER WITH PEER-TO-PEER ACTUATOR COMMUNICATION

CROSS-REFERENCE TO RELATED APPLICATION

This application claims the benefit of provisional application Ser. No. 60/009,865 filed Dec. 21, 1995, now abandoned.

BACKGROUND OF THE INVENTION

1. Field of the Invention

The present invention relates to systems for controlling the cross-directional profile of sheet materials, such as paper, during manufacture thereof, and more specifically to distributed-intelligence cross-directional profile control systems utilizing "smart" actuators.

2. Description of the Related Art

It is well known that on-line measurements can be made to detect properties of sheet materials during manufacture thereof. Generally speaking, on-line measurements are made to enable prompt control of sheet making processes and, thus, to enhance sheet quality while reducing the quantity of substandard sheet material which is produced before undesirable process conditions are corrected. In the papermaking industry, for example, on-line sensors can detect variables such as basis weight, moisture content, and caliper of paper sheets during manufacture.

To detect cross-directional variations in sheet materials, it is well known to use scanning sensors that travel back and forth across the sheet in the cross direction while detecting values of a sheet property along each scan. The term "cross direction" (or "CD") refers to the direction across the surface of the sheet perpendicular to the machine direction, that is, the direction of travel of the sheet material.

Measurement information provided by the scanning sensors is assembled for each scan to provide a "profile" of the detected property of the sheet in the cross direction. Each profile thus comprises a succession of sheet measurements at adjacent locations or slices, the profile extending generally in the cross direction. From such profiles, cross directional variations in sheet properties can be detected. Based upon the detected cross directional variations, appropriate control adjustments can be made to the sheet making machine. Such adjustments are made by pluralities of cross directional actuators, such as motor driven slice lip profile control actuators located at the discharge of the headbox of a paper machine; inductive heaters for controlling the diameters of calender and/or other paper machine rollers along the length thereof; and coating blade actuators for controlling the CD weight profiles of coatings applied to one or both surfaces of the paper.

U.S. Pat. No. 4,692,213 issued Sep. 8, 1987, shows an example of an adjustment device for a headbox slice lip and is incorporated herein by reference for its teaching of the importance of precise control of the slice lip contour. A coating weight measuring and control apparatus and method are disclosed in U.S. Pat. No. 4,957,770 also incorporated herein by reference.

It is also well known in the paper industry that CD profile control actuators can be networked using some form of a serial communications link whereby information (e.g., control actions, setpoints, status, positions) may be transmitted bidirectionally between a supervisory or host control system and the individual actuators. The prior art includes systems using a host controller (e.g., supervisory control system, PLL or network server) to send profile set points to the actuators which are operated simply as slaves. In other words, the algorithms to determine the position, movement, power level, etc. are centralized in the host controller. The individual pieces of information may be conveyed to the actuators over some form of serial link but there is no peer-to-peer communication and no resident algorithm situated at the actuator using information from its peers. U.S. Pat. No. 5,381,341 issued Jan. 10, 1995, discloses a control system for regulating the transverse profile of the properties of a web in a paper or board machine utilizing a plurality of slice lip actuators provided with "intelligent" actuator controllers arranged along a serial bus. Each actuator controller is provided by a host computer system with a set value along the serial bus whereupon the actuator controller then handles the control of slice lip position in accordance with its own measurement algorithm. Although set values are communicated from the host control system to the actuators and status and measurement values are communicated to the host system from the actuator controllers, communication between the controllers is not provided. In effect, what is described in the '341 patent is a master/slave system in which communication between the host system and individual actuators occurs along a serial bus. The set value provided by the host system to a given actuator controller is the target value used by that controller for servoing the associated actuator to a new position. Peer-to-peer communications, that is, communications between adjacent nodes are not provided for and profile control is dependent entirely upon calculations made by the host system.

Consequently a substantial processing burden remains on the host system resulting in certain limitations. For example, in the case of slice lip profile control, bend limit protection may be compromised because the host system cannot adequately handle the calculations needed to assure that the yield point of the slice lip is not exceeded along the entire length of the slice lip.

Distributed intelligence computer control systems are disclosed in U.S. Pat. Nos. 4,918,690 and 5,513,324 is sued to Echelon Systems Corporation, Palo Alto, Calif., U.S.A., and incorporated herein by reference for their teachings of techniques for communicating information between nodes in a network. These patents describe aspects of Echelon's "LonWorks" system for providing sensing, control and communication between networked nodes.

SUMMARY OF THE INVENTION

The present invention uses a LAN (local area network) to tie a series of actuators (across the paper machine width) together and to also permit communication with the supervisory or host control system. The present invention thus allows peer-to-peer (i.e., actuator-to-actuator) communication to take place so that an algorithm resident in each actuator can make target value decisions based on information received from its peers. An example would be bend limit protective control for CD basis weight actuators used to bend a slice lip on a paper machine. In this example, the actual position of adjacent actuators would be received over the LAN. Another example would be in calender roll heating using an inductive heating device whereby temperature measurements from adjacent zones can be shared along the LAN and a local algorithm can be used to control the power applied at any particular location depending on the information received. Among the advantages of the present invention are improved speed or response, accuracy in actuator settings and the ability to take into account such parameters as the bend limit of headbox slice lips to adequately protect various elements, such as the slice lip, of the paper machine.

BRIEF DESCRIPTION OF THE DRAWINGS:

The detailed description of the invention will be made with reference to the accompanying drawings, in which.

DETAILED DESCRIPTION OF THE PREFERRED EMBODIMENT

Although the present invention has general applicability to the control of cross directional actuators for regulating the transverse or cross directional profile of a variety of properties of a web being produced, the present invention will be described, by way of example, in the context of the control of the slice lip of a paper machine headbox.

Figure 1:
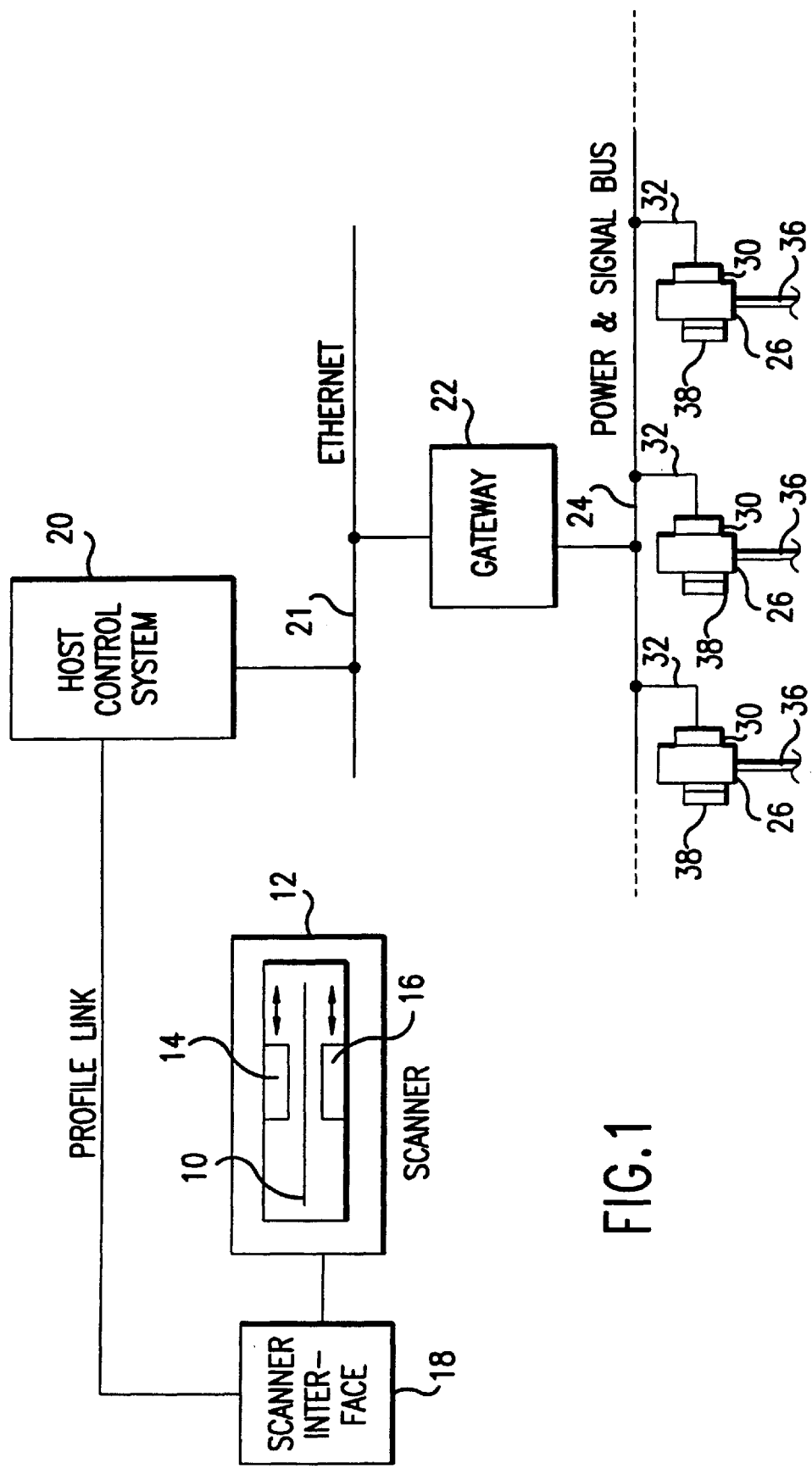
FIG. 1 is a block diagram of a control system in accordance with the present invention.

With reference to FIG. 1, there is shown in block diagram form, an overall actuator control system of the present invention for controlling the cross directional profile of a web 10, in this case a paper sheet. The system includes a scanner 12 including heads 14 and 16 which scan across the sheet 10 in a manner well known in the art to produce an analog electrical signal representative of the property, such as caliper, basis weight or moisture, being measured. The output of the scanner 12 is coupled to a scanner interface 18 which digitizes the output signal from the scanner and additionally functions to control the operation of the scanner. The digitized signal representing the profile of the measured property is applied to a host computer control system 20 providing profile control information to a network interface or gateway 22 in turn connected to a power and signal network bus 24.

Figure 2:
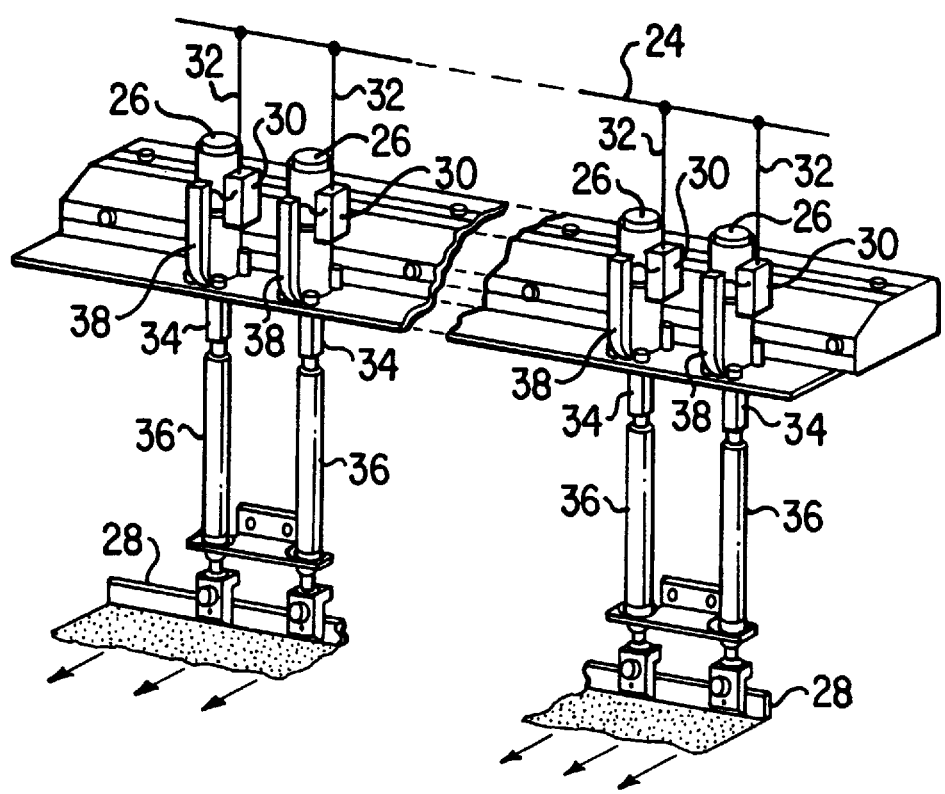
FIG. 2 is a perspective view of portions of a headbox slice lip profile regulating mechanism employing aspects of the present invention.

With reference now also to FIG. 2, a plurality of actuators 26 arranged along a slice lip 28 at uniform intervals of, for example, four inches, operate to deform the slice lip and to control its contour or profile and thereby the slice opening profile. Each actuator 26 preferably comprises a backlash-free harmonic drive slice lip actuator motor of the type described in U.S. Pat. No. 4,833,941, issued May 30, 1989, which is incorporated herein by reference. Each actuator motor 26 has an associated actuator controller 30 preferably mounted on the body of the actuator. Electrical connections 32 couple the controllers 30 with the network bus 24. Communications between the actuator controllers 30 and the gateway 22, as well as peer-to-peer communications between adjacent actuator controllers 30, take place along the network bus 24. Each actuator motor 26 is coupled to the slice lip 28 by means of a rotatable turnbuckle 34 and spindle rod 36. Rotation of an actuator motor 26 and associated turnbuckle causes the corresponding spindle rod to move up or down to displace the slice lip accordingly, all as well known in the art. The slice lip position is measured locally at each actuator motor by means of an LVDT (linear variable differential transformer) 38, a well known, highly accurate linear displacement measuring device. Each LVDT 38 provides an accurate indication of slice lip displacement and position and constitutes part of a closed-loop position control system for controlling the local position and hence overall profile of the slice lip. Such closed-loop systems are well known in the art and are further explained in the incorporated U.S. Pat. No. 4,833,941.

Figure 3:
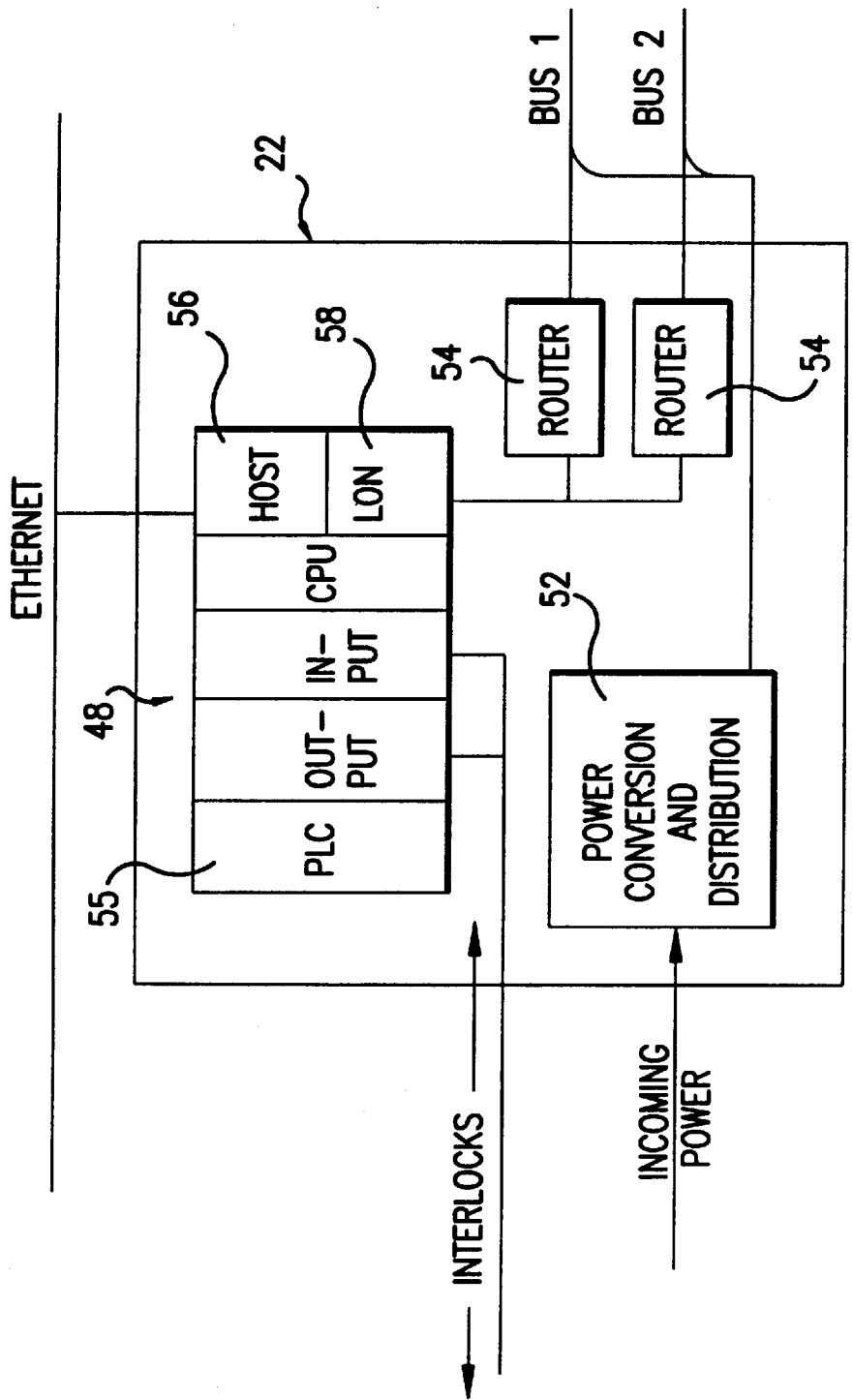
FIG. 3 is a block diagram of a gateway or network interface forming part of the control system of the present invention.

With reference to FIG. 3, the gateway 22 contains standard components comprising an industrial PC 48 including a CPU 50; power conversion and distribution devices 52 (transformers, DC power supplies); protection devices (circuit breakers, fuses); communications devices (routers 54, Ethernet converters, RS-485 converters); and a programmable logic controller 55 (PLC) with limited I/O if interlocks are required.

The primary functions performed by the gateway 22 are as follows:

1. Protocol Conversion

The gateway 22 acts as a protocol converter. It must interpret messages from the supervisory or host control system 20, and convert and distribute this information to the actuator controllers 30. Similarly, information originated by the actuator controller 30, such as actuator position and status, must be received, converted and transmitted to the host 20. This information can then be used by a CD control algorithm, or be displayed to the operator.

The protocol conversion is performed by the CPU 50 and the HOST and LON (local operating network) cards 56 and 58, respectively, as indicated in FIG. 3. The CPU 50 is a VME backplane, 80486 processor executing a real-time multitasking operating system. The HOST card 56 is the interface to the host control system 20. The LON card 58 is the network interface to the actuator controllers 30. The software executed by the CPU 50 includes a database to store network node addresses and message indexes, protocol tasks to interface to the host 20 and to the actuator controllers 30, and tasks to control the overall data transfer.

2. Host Communication Interface

The host typically receives the paper measurements (e.g., basis weight, moisture, caliper) from the scanner system interface 18 and calculates new actuator setpoints using a control algorithm. The host 20 must transmit these desired setpoints to the actuator controllers 30. This is typically performed by a controller (such as a PLC) linked to the host 20 via a serial communication interface (point-to-point or some form of master/slave arrangement), or via a local area network (LAN). Additional information such as individual actuator position and status, actuator tuning and configuration, and system status (interlocks) are communicated between the host 20 and the gateway 22. In FIG. 3, the HOST interface card 56 is an Ethernet interface card. This could also be a serial interface in some cases. A number of protocols have been implemented with various products of Measurex Corporation, Cupertino, Calif., USA. The LAN interface is based on Ethernet. The protocol is a Measurex developed protocol, Open Data Exchange (ODX), which is layered on top of TCP/IP. This type of interface is standard with current Measurex product lines. The common serial protocols are Modbus RTU (an industry standard), SCL (Measurex protocol) and 200/100 (Measurex protocol). The gateway 22 supports these protocols, all of which are commercially available, to insure compatibility with older products.

3. Actuator Communication Interface

This interface consists of software within the PC 48, a network interface communications card, and network router(s) 54. A network router 54 performs three functions:

a. Media conversion—Devices in the gateway such as the PC and a network management and installation tool require a 1.25 Mbps channel, whereas the actuators communicate at 78 Kbps over a free-topology channel. The router provides the media conversion.

b. Extend the limits of a single channel—Each actuator LAN channel supports up to a maximum of 62 actuators. For systems with more than 62 actuators, additional routers are required.

c. Improve network performance—A router 54 can isolate network traffic to a channel. An intelligent router can decide if a message must leave the channel based on the location of the destination node in the network topology.

4. Power Conversion and Distribution

For basis weight or caliper control actuator systems, the actuators 26 receive power from the gateway 22. Depending on the type of actuator and the installation site, a transformer may be required to convert the site-supplied voltage to the actuator required voltage. A DC power supply is required to power the electronics in the actuator. Circuit breakers and fuses within the gateway distribute power and protect the various devices being powered by the gateway.

5. System Interlocks

Interlocks may be required to coordinate the actuator system with the paper machine or the operator, for safety reasons, or for protection of the equipment. In the event that a system requires interlock support, a PLC 55 is installed in the gateway 22 along with digital input and output modules 60 and 62 to handle the individual signals.

Figure 4:
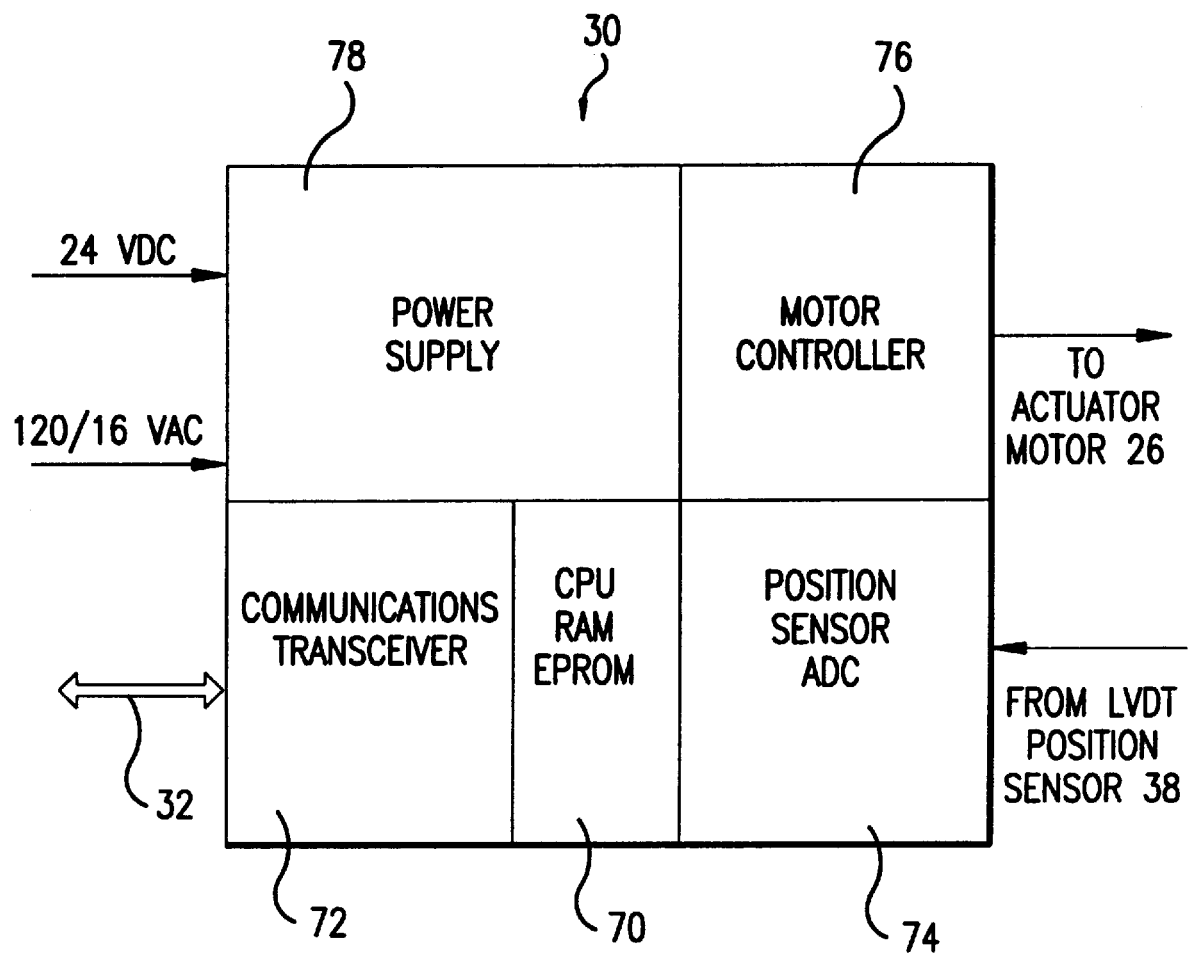
FIG. 4 is a block diagram of a typical actuator controller used in the present invention.

FIG. 4 is a block diagram of a typical actuator controller 30. The controller 30 is housed within a sealed enclosure for protection against the high humidity, moisture and heat as well as caustic chemicals and solvents typically found in a paper mill environment. The controller 30 comprises five main sections: a processor section 70 comprising a CPU, a RAM and an EPROM containing the control algorithm; a communications transceiver 72; a position sensor analog-to-digital converter (ADC) 74; a motor controller 76; and a power supply 78. Communications between the actuator communications interface of the gateway 22 and the processor section 70 are handled by the communications transceiver 72. The processor section 70 and communications transceiver 72 may comprise a control module (Part No. 55020-01) manufactured by Echelon Systems Corp., Palo Alto, Calif., USA. The position sensor ADC 74 receives from the associated LVDT sensor 38 signals proportional to the position of the spindle 36. The analog position signals are digitized by the ADC 74 and entered into the RAM portion of the processor section 70. The motor controller 76 includes the necessary circuitry (including triac switches and phase shift network) for controlling the actuator motor 26, typically comprising a synchronous AC motor. The power supply 78 may comprise a 5 VDC switching supply for powering the controller electronics.

The power and signal bus 24 is a six wire bus distributing power to the actuator controller 30, and communications to the actuator controllers 30 and to the gateway 22. Physically, the signal bus part of the power and signal bus 24 consists of one unshielded twisted pair of wires. This bus consists of one or more free-topology channels with a maximum of 62 actuators communicating on one channel. Gateway/actuator communications may be implemented using the LonTalk® protocol of Echelon Corp. The protocol follows the International Standards Organization Open Systems Interconnect (ISO OSI) reference model, and supports distributed, peer-to-peer communications between nodes.

Using headbox slice lip actuators 26 as an example, wherein it is important to observe the bend limits of the slice lip beam structure, the following sections describe typical parameters which may be defined and the messages communicated between the gateway 22 and the actuators 26, and between the actuators 26 themselves (peers). The parameters and messages required for a given system will be evident to those skilled in the art, and the following are examples only.

1. Configuration

A number of parameters can be configured, and customized to suit the slice lip actuator application. Typically these values are set once, and rarely would need to be changed. For slice lip actuators 26, the following parameters may be defined:

Actuator type
Maximum send rate
Send delta value
Runaway enable
Feedback enable
Bend limit enable
Peer send rate
Zero cross enable
50/60 Hz flag
A/D sample rate
Peer retries
Peer multiplier
Startup delay
Supply error
Peer transmit delay
Status transmit delay
Randomize flag These parameters define for the actuator controller message sending rates, timers, and which algorithms to invoke.

2. Tuning

A number of tuning parameters may be defined; these parameters define the behaviour of the control algorithm:

Upper setpoint limit
Lower setpoint limit
Minimum actuator rate
Position sensor filter factor
Minimum control cycles
Movement failure limit
Runaway limit
First order bend limit
Second order bend limit
Position deadband
Sensor deadband
Sensor low limit
Sensor high limit
Alarm deadband 3. Commands A command message can be sent to instruct the controller to take some action. The defined commands may include:

Actuator Mode
Actuator Reset
Actuator Self-Test
Calibrate Position Sensor

4. Setpoint

This message is transmitted from the gateway to the actuator controllers. A setpoint is generated by the host 20, and transmitted as a setpoint array (typically in microns or 0.001 inch units) to the gateway 22. The gateway 22 then distributes the desired setpoints to the individual actuator controllers 30.

5. Status

This message is transmitted from the actuator controllers 30 to the gateway 22. Information such as actuator position and status alarms are included in the message. The following is a list of the types of data that may be contained in a status message:

Actuator mode

Actuator type

Software revision number

Control setpoint

Host setpoint

Actuator position

Alarm word 1

Alarm word 2

Sensor value (millivolts)

Raw sensor value (A/D counts)

Sensor gain

Sensor offset

6. Peer Status

This message type is transmitted between actuator controllers 30. Actuator position and actuator status information is transmitted by each actuator controller to each immediately adjacent actuator controller, as will be explained in greater detail below. Each actuator controller 30 receives a desired setpoint from the host control system 20 via the gateway 22. Based on the actuator tuning parameters and information from the adjacent actuators, a control setpoint is calculated. The ADC 74 of the controller 30 converts a signal from the position sensor 38 into a digital signal representing the physical actuator position. Based on the actuator control setpoint and the actuator position, a position error is calculated. From this error, the controller 30 calculates which direction the actuator must move, and estimate a time that it will take the actuator to reach the control setpoint (or reduce the error to an acceptable level). The controller 30 will assert a slice lip open or close control signal, and switch an AC voltage to the actuator motor 26 via the motor controller 76. The actuator motor 26 will move in the open or close direction for as long as the control signal is asserted. This form of closed loop control may be executed at least once per second. During each iteration, the controller 30 will also monitor the performance of the actuator 26 and assert any status alarms if the actuator is not operating as anticipated. Some of the alarms that can be generated include:

Actuator moving too slow

Actuator moving in the wrong direction

Actuator runaway

Position sensor undervoltage

Position sensor overvoltage

Figure 5:
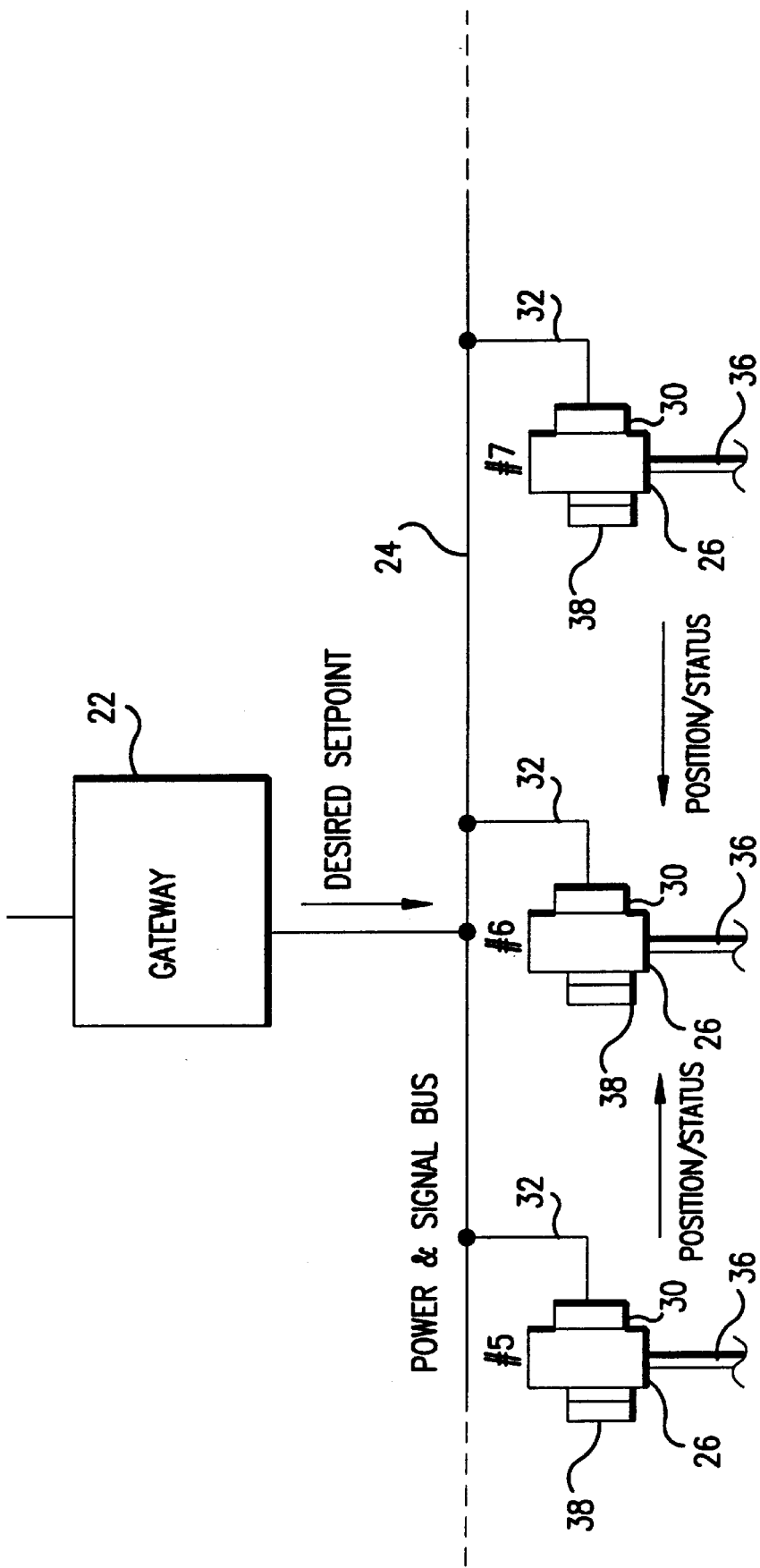
FIG. 5 is a block diagram of a portion of the control system of the present invention illustrating the peer-to-peer control feature.

To provide slice lip bend limit protection, the control system must take into consideration the mechanical properties of the slice lip 28 that the actuators 26 deform to control the paper CD basis weight profile. Such mechanical properties are well known to skilled artisans in the paper machine field. In existing control systems, after the host control system has calculated the desired actuator setpoints, it typically checks these setpoints against the mechanical properties of the slice lip to ensure the yield point of the lip will not be exceeded. If the yield point is exceeded, the setpoint is clamped. However, there are drawbacks to this prior art approach. The host system calculations are based on a desired actuator setpoint. They are not based on the actual actuator position. In addition, the traditional method of implementing a "bend limit" algorithm is flawed, and may not clamp all setpoints exceeding the yield point. This is primarily due to the limited amount of processing power available to the host system. The intelligent actuator system of the present invention has been designed to prevent damage to the slice lip 28 by taking advantage of the distributed peer-to-peer nature of the control system. FIG. 5 shows in block diagram form the peer-to-peer control system of the present invention. To calculate an actuator control target setpoint, a given actuator controller 30 requires: a desired actuator setpoint from the host 20 via the gateway 22; the actual positions and statuses of the immediately adjacent actuators 26; and knowledge of the mechanical properties of the slice lip (first order and second order tuning parameters). Based on the statuses of the adjacent actuators 26, the controller 30 determines if it will allow a new actuator setpoint to be calculated. This determination may be based, for example, on algorithms applying well known beam flexure formulas which express the relationships between the external forces acting on a beam and the resulting unit stresses at any point on a particular section of the beam. If an adjacent actuator has failed, no further setpoint processing will occur. If the controller 30 determines that new setpoints can be processed, the controller uses the new setpoint, the adjacent actuator positions and the first or second order tuning parameters to calculate a control setpoint. It is this new control setpoint that is used by the position control algorithm.

Figure 6:
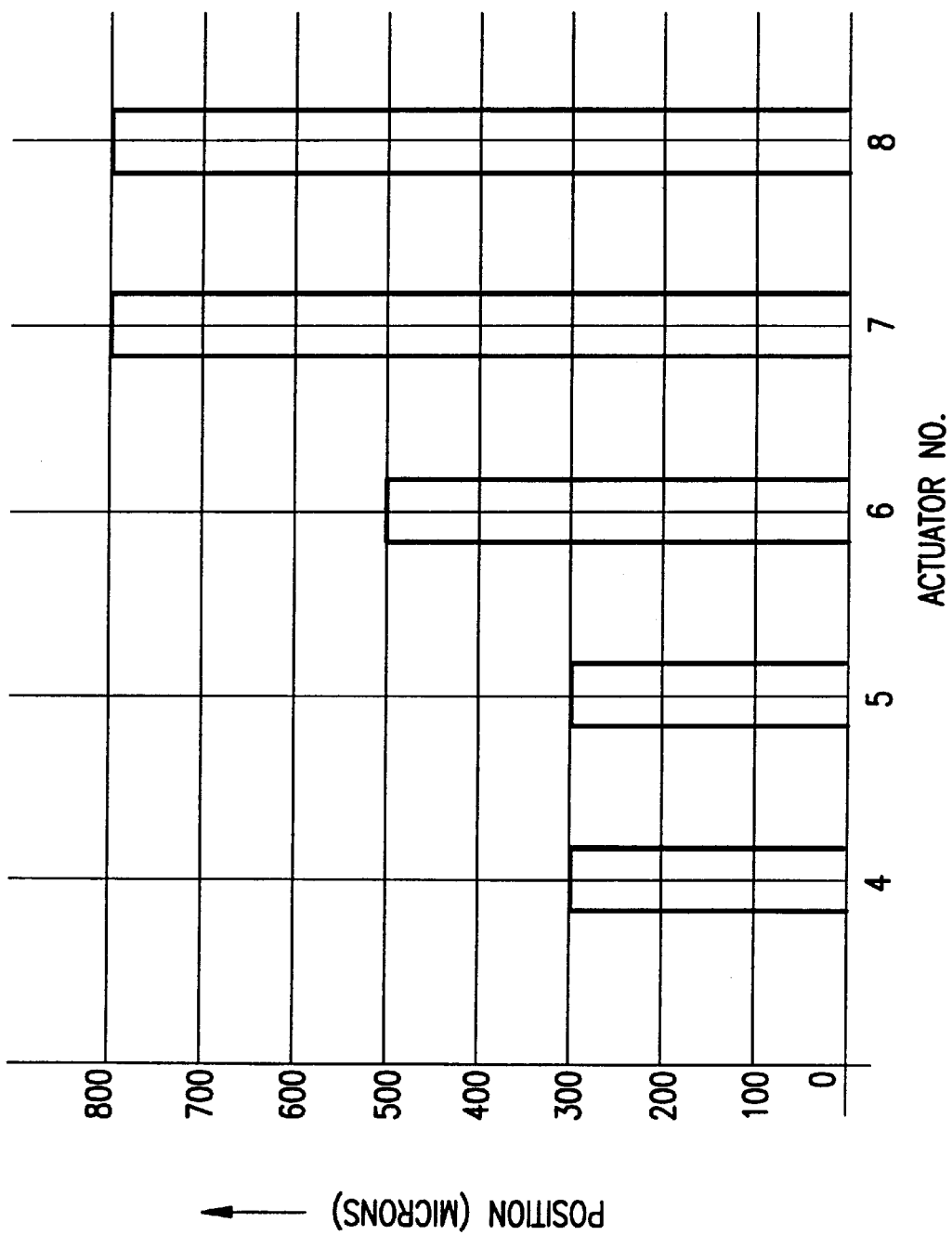
FIGS. 6–8 are bar graphs illustrating the strategy of the peer-to-peer control feature of the invention in the context of slice lip profile regulation.

With reference to FIG. 5, which shows three actuators 26 in the CD zones 5, 6 and 7 taken as examples of an actuator array that may include several dozen actuators, the following is an example of a bend limit calculation, assuming a bend limit of 200 $\mu$m. Assume that the actuators at zones 5, 6 and 7 are initially in the positions shown in FIG. 6. Actuator No. 5 is at +300 $\mu$m, actuator No. 6 is at +500 $\mu$m, and actuator No. 7 is at +800 $\mu$m.

With zone 5 position=300 $\mu$m and zone 7 position=800 $\mu$m relative to a datum, then the average of these positions is:

$$\frac{300 + 800}{2} = 500 \,\mu m$$

Figure 7:
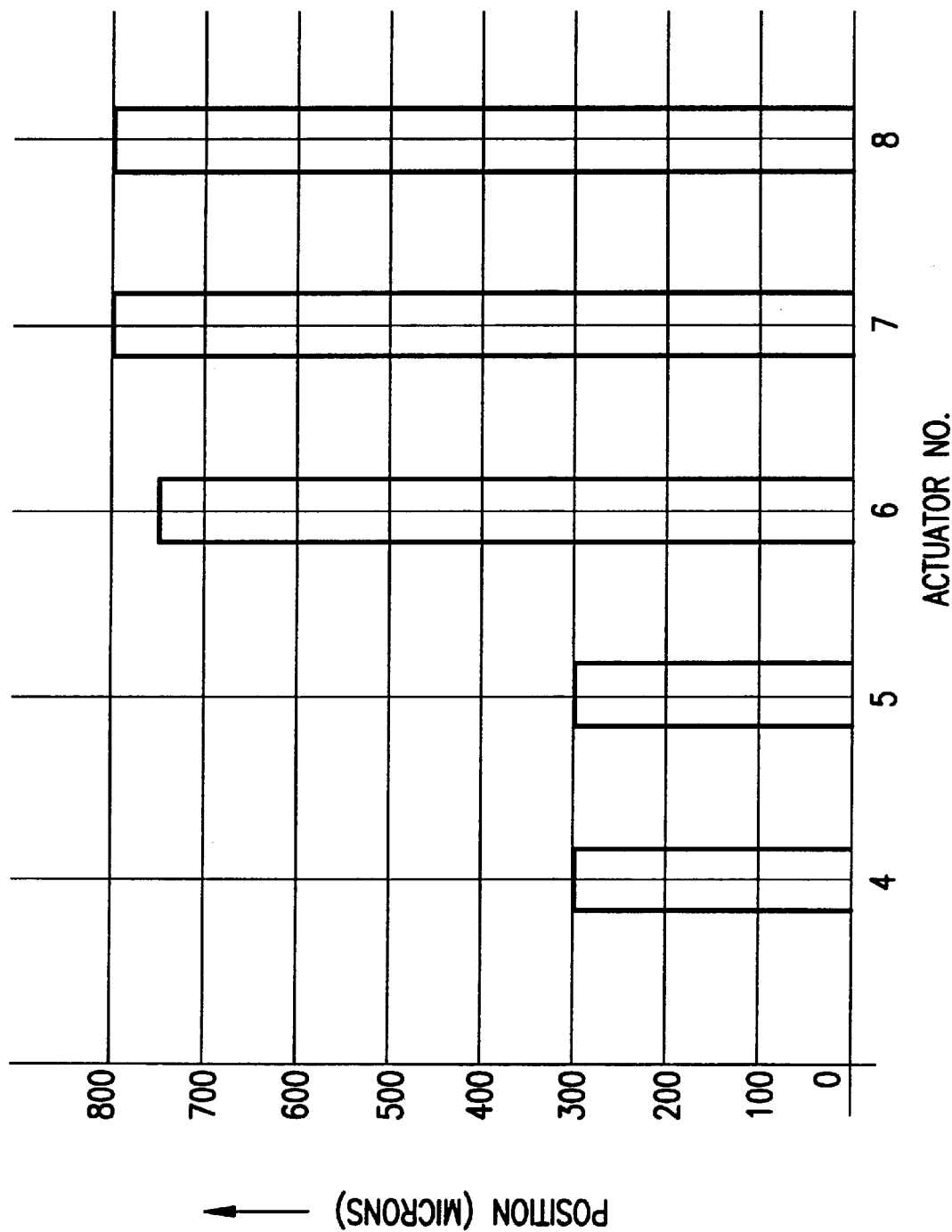
Figure 8:
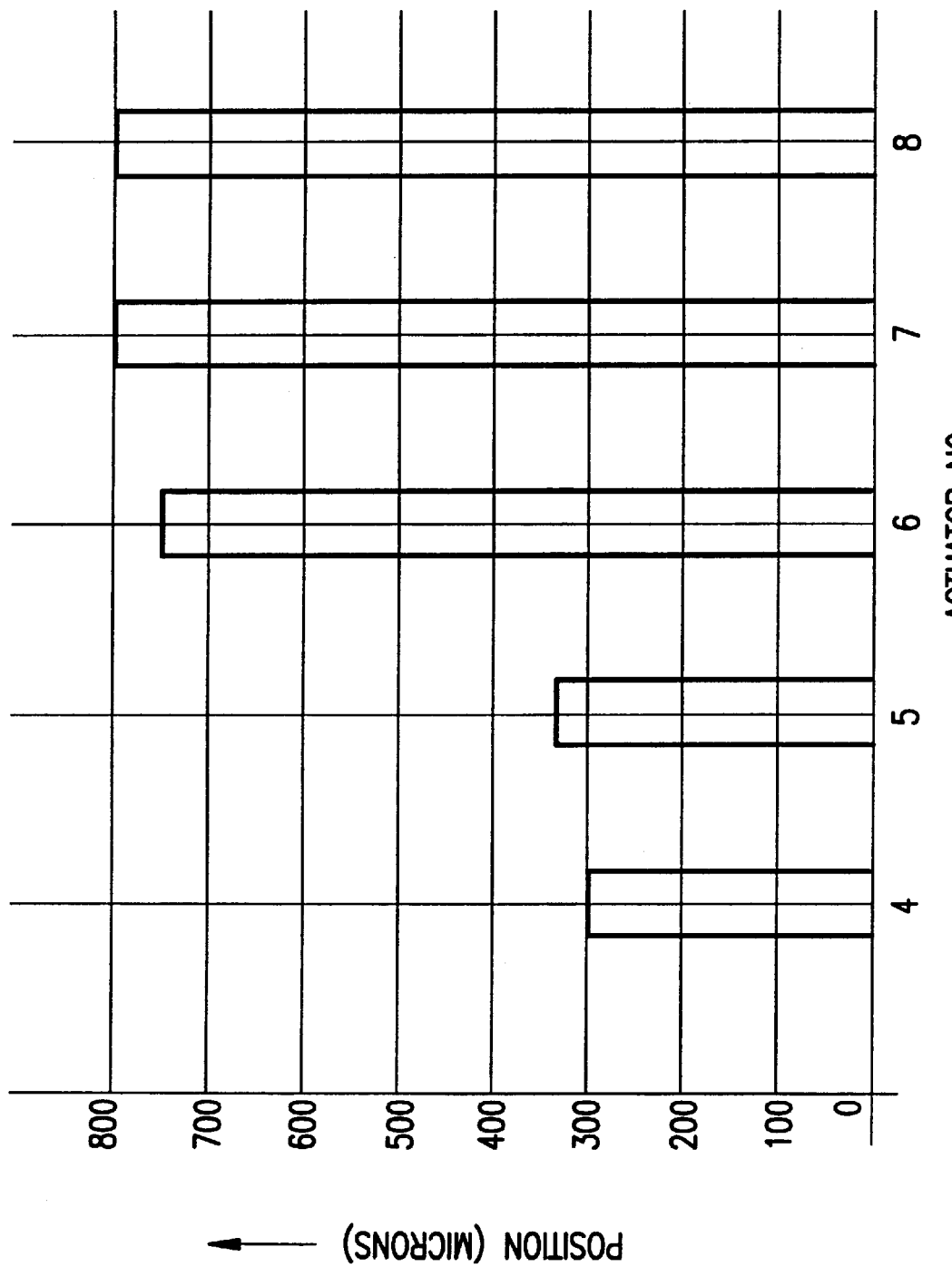

Since the allowable setpoint range for each zone is established as ±200 $\mu$m based on the known mechanical properties of the slice lip, the allowable setpoint range for zone 6 in this example will be 550 $\mu$m±200 $\mu$m or 350 $\mu$m to 750 $\mu$m. Now assume that a desired setpoint of +850 $\mu$m is transmitted from the host for actuator No. 6. The actuator controller 30 for actuator No. 6, using the bend limit algorithm, will calculate a target setpoint of +750 $\mu$m based on the allowable setpoint range described above, and move actuator No. 6 to the target setpoint as shown in FIG. 7. However, this new setpoint for actuator No. 6 places the position of actuator No. 5 (at +300 $\mu$m) outside of the allowable bend limit range of ±200 $\mu$m. With actuator No. 4 at +300 $\mu$m and actuator No. 6 at +750 $\mu$m, the average is:

$$(300+750)/2=525 \,\mu m$$

and the allowable setpoint range for actuator No. 5 is thus +525±200 $\mu$m, or +325 $\mu$m to +725 $\mu$m. As a result, actuator No. 5, through the network communications between its controller and the controllers of actuator Nos. 4 and 6, will move to compensate, that is, to +325 μm, as shown in FIG. 7.

The foregoing illustrates that the overriding strategy, in accordance with the invention, is to prevent excessive bending of the slice lip, even if it sacrifices CD control performance. It is also possible that in some extreme cases, a single change in one actuator setpoint could cause a reaction to this movement to ripple across the entire actuator system. One situation where this could arise is if every actuator were in a "bend limit situation", as illustrated above in the example involving actuator No. 5. In the event that an actuator 26 stops communicating to its peers, a watchdog timer will expire, and adjacent actuators will discontinue processing new setpoints from the gateway 22.

The controller 30 will "fail" an associated actuator 26 if it does not operate properly. Once an actuator has been "failed", the controller will no longer perform any control actions until the host 20 issues an actuator reset command. If an actuator moves after it has been "failed", the controller may determine that this actuator is a "runaway". This could occur if the actuator motor 26 has a short-circuit, or due to a failure in the controller electronics. In this event, a miniature relay is de-energized, and the AC power is physically removed from the motor. This provides additional slice lip protection.

What is claimed is:

1. A distributed intelligence control system for controlling a cross direction profile characteristic of a traveling sheet during production, the control system including:

means for measuring a property of the sheet at a plurality of cross direction locations, the measuring means producing output signals indicative of the cross direction profile characteristic;

a host controller system coupled to receive the output signals from the measuring means and adapted to produce signals representing desired profile information, based on the output signals from the measuring means;

a plurality of actuators positioned at spaced apart locations across the width of the sheet, each actuator being individually adjustable in response to a control signal to adjust the profile characteristic of the sheet at the location of the actuator, each actuator having an actual adjustment state;

a plurality of intelligent actuator controllers, each controller being operatively associated with a corresponding one of the plurality of actuators and providing the control signal to said actuator; and a local area network providing a bidirectional communication link (1) between the host controller system and the intelligent actuator controllers and (2) between adjacent actuator controllers, the network transmitting to said intelligent actuator controllers the desired profile information from the host controller system and transmitting between adjacent intelligent actuator controllers actual adjustment state information, each intelligent actuator controller calculating a target actuator adjustment state for the corresponding actuator based upon the transmitted information.

2. A distributed intelligence control system, as defined in claim 1, in which the traveling sheet is paper, the control system controls the profile of the slice lip of a paper machine headbox, and the plurality of actuators are attached to the slice lip at points spaced along the slice lip, the actuators controlling the profile of the slice lip.

3. A distributed intelligence control system, as defined in claim 2, in which the actuator controllers provide slice lip bend limit protection, said protection being based on desired actuator setpoint information from the host controller system, actual position information from immediately adjacent actuator controllers, and a predetermined bend limit, to prevent excessive bending of the slice lip.

* * * * *